United States Patent [19]
Ernster

[11] 3,846,397
[45] Nov. 5, 1974

[54] PROCESS FOR UTILIZING BARLEY MALT

[76] Inventor: John H. Ernster, 4530 Sugarhill Dr., Rolling Hills Estate, Calif. 90274

[22] Filed: Apr. 6, 1970

[21] Appl. No.: 26,025

[52] U.S. Cl............. 260/112 R, 426/364, 426/436, 426/807, 260/112 G
[51] Int. Cl................................................ C07g 7/00
[58] Field of Search ............... 99/2 R, 5, 14, 50, 57, 99/52; 260/123.5, 112 R, 112 G

[56] References Cited
UNITED STATES PATENTS

| | | | |
|---|---|---|---|
| 965,521 | 7/1910 | Hoffmann | 99/5 |
| 1,815,160 | 7/1931 | Oppenhein | 99/5 |
| 2,070,286 | 2/1937 | Lissaver et al. | 99/5 |
| 2,754,211 | 7/1956 | Siefker et al. | 99/2 |
| 3,127,388 | 3/1964 | Johnson et al. | 99/14 |
| 3,212,902 | 10/1965 | Bavisotto | 99/5 |
| 3,308,113 | 3/1967 | Johnsen et al. | 99/14 |
| 3,364,265 | 1/1968 | Klingel et al. | 99/52 |

OTHER PUBLICATIONS

Feeds and Feeding – Morrison, 22nd Ed., Morrison Pub. Co., Ithaca, N.Y., 1957.

*Primary Examiner*—Norman Yudkoff
*Assistant Examiner*—Hiram H. Bernstein
*Attorney, Agent, or Firm*—Edward D. O'Brian

[57] ABSTRACT

Grain residues from mashed barley malt are separated from wort thereby produced and heated in an alkaline solution to solubilize protein. The alkaline solution is separated from the unsolubilized grain residues and acidified to precipitate water soluble protein. Beer is brewed from the wort and the unsolubilized grain residue can be used as animal feed.

2 Claims, 1 Drawing Figure

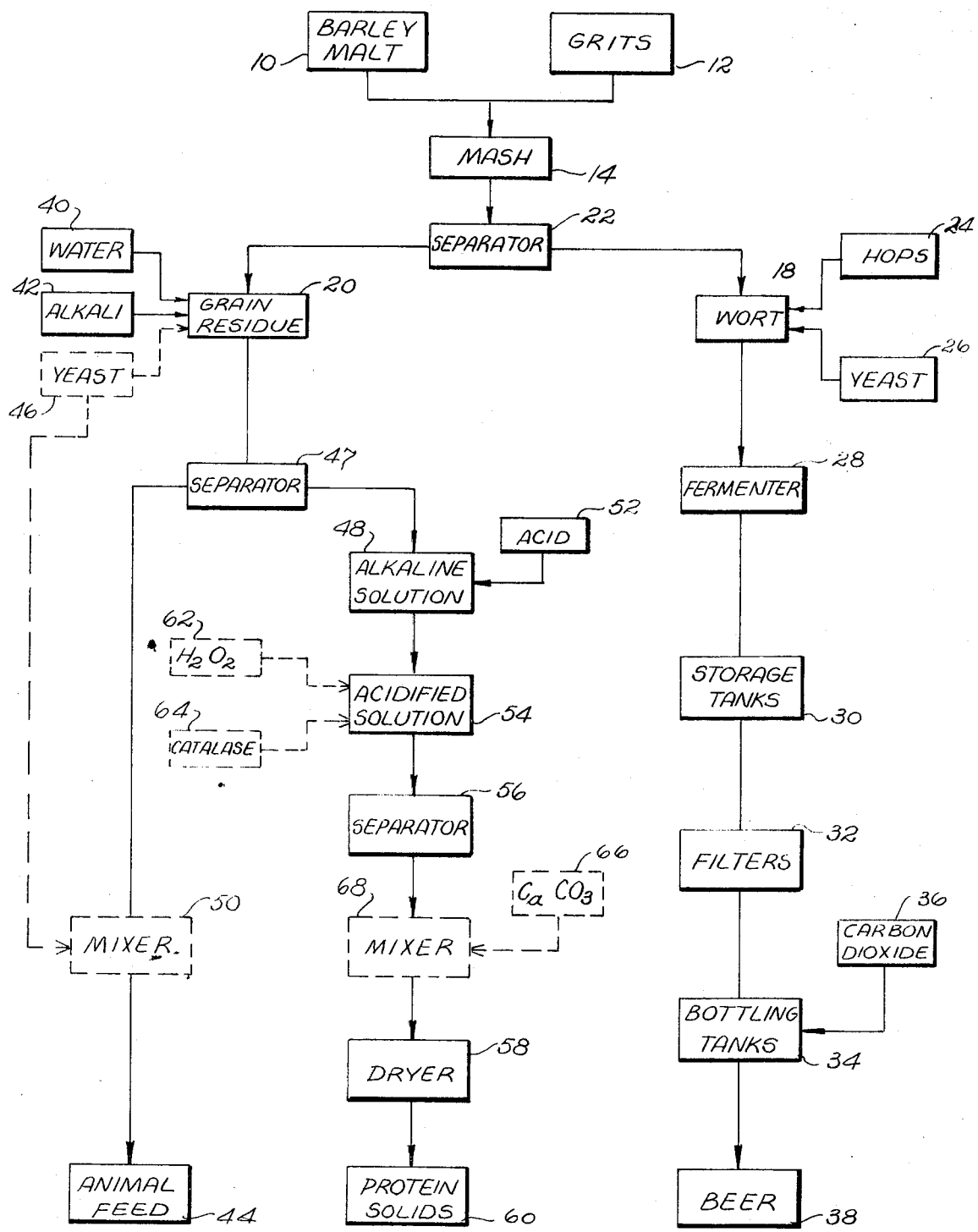

PROCESS FOR UTILIZING BARLEY MALT

FIELD OF THE INVENTION

The fields of art to which the invention pertains include the field of vegetable processing, particularly malt processing, fermentation processes, and animal feed recovery from food and beverage processes.

BACKGROUND AND SUMMARY OF THE INVENTION

Barley malt is the principal raw material in the brewing of malt beverages such as beer, ale, stout and porter. In the processing of barley malt to produce such beverages, the malt along with such adjuncts as rice and corn grits are mashed by heating whereby starch is enzymatically converted to sugar This results in an extract called the wort which is then separated from coagulated and precipitated protein and insoluble grain residue. Hops and yeast are added to the wort which is then placed in fermenters where it is brewed and further treated to produce beer. The insoluble grain residue and other precipitated matter are referred to as "spent grains" or brewer's grains and are either sold at very minimal prices or given away in return for the cost of disposal, commonly for use as animal feed.

The present invention provides a method for the utilization of barley malt whereby further value may be recovered when the malt is utilized in a brewing process. In particular, the present invention provides for the recovery of high quality, water-soluble protein solids from what would otherwise be considered spent grain. The protein solids are recovered from the insoluble grain residue which can thereafter still be utilized as animal feed without any significant reduction in its commerical value. The recovered protein solids are of high quality; for example, they are completely water soluble and have blander flavor and better color than proteins recovered from soy beans.

With regard to specific process steps, the present process involves a method for utilizing barley malt comprising mashing the malt to form a wort and grain residue, separating the wort from the grain residue, heating the grain residue in an aqueous alkaline solution whereby to solubilize protein from the grain residue, separating the alkaline protein solution from unsolubilized grain residue, acidifying the alkaline protein solution whereby to precipitate the protein, and separating the precipitated protein. Heating of the grain residue is carried out at a rate of at least 1° Farenheit per minute to a temperature of about 180°–212°F. Alkali is added over a substantial period of the heating at a rate whereby to raise the alkalinity of the solution to about pH 9.0 when the temperature is in the range of 180°–212°F. Acidification to precipitate protein can be accomplished by adding sufficient hydrochloric acid to lower the pH of the solution to about 6 and the precipitated protein solution is fed to a centrifugal separator where the precipitated protein is separated as a wet slurry containing about 25–75 percent solids. The slurry may be dried so as to contain less than 10 weight percent moisture content. In particular embodiments, heating of the "spent grains" is effected uniformly by the infusion of steam and alkali is added so as to equably raise the pH of the protein solution. Good yields of high quality protein solids are obtained by heating a grain residue slurry at a rate of 2°F/minute or greater while adjusting the alkalinity to accomplish a pH of about 9.0 at about 195°F.

Yeast can be added to the grain residue prior to solubilization of protein, or to the unsolubilized grain residue resulting from soluble-protein extraction, for enrichment of the food value of the grain residue. In other particular embodiments, hydrogen peroxide can be added to the acidified solution whereby to bleach the precipitated protein. Calcium carbonate can be added to the separated precipitated protein in sufficient quantity to raise the pH level to about 6.5–7.0 and thereby provide calcium enriched, bleached protein solids to be dissolved in water to yield a milk substitute.

BRIEF DESCRIPTION OF THE DRAWING

The drawing is a flow chart of barley malt utilization wherein beer, protein solids and animal feed are produced from a particular charge of barley malt.

DETAILED DESCRIPTION

Referring to the drawing, the initial steps of the present utilization process, up to the separation of grain residue from wort, can be identical to any of the variety of processes that are commercially utilized in the production of beer. Barley malt 10 is barley which has been soaked in water and allowed to germinate, after which it is dried and ground to a flour. The barley malt 10 is fed through mash tubs wherein its starch is fermented to sugar at temperatures of about 60°–70°C, as well known to the art. Simultaneously, adjuncts such as rice and refined corn grits, indicated in the flow chart as grits 12, are boiled and gelatinized and mixed with the mashed barley malt in mixing tanks for the conversion of their starches to sugar by malt amylases. The result is a mash 14. The mash 14 is brought to a boil which starts the enzyme action and coagulates and precipitates proteins which would otherwise impart instability to the resultant beer. The extract thus prepared is called the wort 18 and is separated from the insoluble grain residue 20 in a lauter tub which is a straining tank with a perforated false bottom. Alternatively, filter presses can be used, the lauter tub, filter press or other equivalent device being referred to in the flow chart as a separator 22.

Following separation, the hot wort 18 is boiled in brew kettles and hops 24 are added to the boiling wort. The wort 18 is then cooled and filtered and yeast 26 is added which may be top fermenting yeast for the production of ale or bottom fermenting yeast for the production of lager beer or ale. The yeast inoculated wort is then fed into fermenters 28 where it is formed into beer. The beer is allowed to rest in storage tanks 30, during which time impurities and yeast cells settle out, passed through filters 32 and then into bottling tanks 34 where carbon dioxide 36 is injected to adjust the carbonation to the proper level. The result is a finished beer product 38.

The foregoing steps involving the treatment of the wort 18 to the production of the beer 38 is in accordance with well known and conventional beer processing methods. The present invention concerns itself primarily with the treatment of the grain residue 20 so that further value is obtained in utilizing the barley malt 10 than is obtained with present commerical practice. In accordance with this invention, the grain residue 20 is not simply utilized as an animal feed but is treated in accordance with carefully formulated procedures so that a substantial protein of the proteins contained in the grain residue is recovered as protein solids which because of the particulars of the manner of recovery are water soluble and represent a valuable by-product of the brewing process. Additionally, the "doubly spent" grains can be disposed of in the same manner and for the same price as in the conventional practice, e.g., as in animal feed. Accordingly, except for reagent chemicals, recovery of protein solids in the manner hereinafter detailed does not require significant raw material costs. The grain residue 20 contains about 13–25 percent protein and about half of that amount is recovered by the present method.

The grain residue 20 can be utilized either dried or as a wet slurry directly from the brewing operation. The grain residue 20 is mixed with sufficient water so that the grains constitute about 10 percent solids and is then heated under controlled pH to dissolve soluble nitrogenous matter. The manner of heating and the manner of controlling the pH are important for a high yield of water soluble protein solids having the desired bland taste characteristics. In particular, the slurry of grain residue 20 is heated so that its temperature is raised to boiling at a rate of at least 1° per minute. The pH of the solution is adjusted by the addition of alkaline material, such as 0.1 normal sodium hydroxide, at a rate whereby to raise the pH of the solution from approximately 6.0 to about 9.0 when the temperature of the solution is about 180°–212°F. Higher alkalinities can be used, but in general the addition of alkali should be accomplished so that a pH of 9.0 is reached at the temperature range of 180°–212°F. For particularly good yields the slurry should be heated uniformly, for example by the infusion of steam, and the pH of the protein solution should be raised equably with respect to temperature rise. This can be accomplished by adding the alkali by means of a continuous microfeed pump controlled by a pH meter and temperature control so that sufficient alkali is added to raise the pH uniformly as the temperature of the solution is raised. Alkaline materials other then sodium hydroxide can be utilized, such as the hydroxides of potassium, ammonium, magnesium, calcium, and the like.

The soluble nitrogenous matter is separated from the remaining, "doubly spent" grain residue by mechanical separation, at 47 e.g., by decantation with a mechanical decantor separator. The remaining, solid unsolubilized grain residue can be dried, e.g., with a hot air drier, until solidified or can be utilized directly as animal feed 44. The unsolubilized grain residue contains insoluble protein and still has its natural value as animal feed. As indicated by the dashed line boxes and arrows in the flow chart, yeast 46 can be added to the grain residue either prior to or subsequent to separation of the alkaline solution 48 of soluble nitrogenous matter. The yeast can be a by-product of the brewing process as previously described, in particular, it can be yeast 26 which has been "spent." The yeast 26 or 46 can be added to the grain residue prior to its hot alkaline treatment in which case it is merely mixed with the grain residue slurry and is carried through with the unsolubilized grain residue following separation of the alkaline solution 48. Alternatively, the yeast 26 or 46 can be added to the unsolubilized grain residue following separation and mixed therewith in a mixer 50 to produce fortified animal feed 44. By utilizing "spent" yeast 26 as an adjunct to the unsolubilized grain residue, further useful by-products can be recovered from the beer brewing process.

The separated alkaline solution 48 of solubilized nitrogenous matter is pumped into a processing tank for acidification. The alkaline solution 48 contains albumin and globulin proteins in solution along with polyphenols, polysaccharides, phytic acid and other solubilized natural components of the barely malt 10 and grits 12. Depending upon the time elapsed since boiling of the alkaline grain residue slurry, the alkaline solution 48 is cooled or heated to a temperature of about 140°F and dilute acid 52, e.g., 0.1 normal hydrochloric acid, is added in sufficient quantity to adjust the hydrogen ion concentration of the solution, whereby to acidify the solution at a pH of about 6.0. This results in precipitation of proteinaceous material from the acidified solution 54. The acidified solution can be fed directly to a separator 56 for separation out of the precipitated material. Any of the previously described separators 22, or 47 can be utilized,however, it is particularly advantageous at this stage to use a desludging centrifuge wherein the precipitated material is separated by means of centrifugal force. The precipitated material is fed from the desludging centrifuge at about 45 percent solids (a range of 25–75 percent is obtainable) into a drier 58 which utilizes infused heated air, e.g., at a temperature of 300°–400°F., to dry the precipitate to a moisture content of less than about 10 weight percent. The resultant protein solids 60 typically contain greater than 50 percent protein equivalent, they are water soluble and have a bland flavor allowing use in a variety of foods. The protein solids 60 can be pelletized or directly packaged.

It may be desirable to bleach the protein solids 60 so as to improve their color and this is particularly desirable when the protein solids are to be utilized to constitute a milk substitute or the like. Bleaching can be effected by adding hydrogen peroxide to the acidified solution, as indicated by the dashed box 62. Commercially available 30–30 percent hydrogen perioxide can be added to the extent of 5–6 parts per thousand to the acidified solution 54 at 140°F during precipitation of the protein. After about 10 minutes, about 2–3 parts per thousand of catalase can then be added, as indicated by the dashed box 64, to decompose the remaining hydrogen peroxide. Catalase is an enzyme having specific catalytic action for the decomposition of hydrogen peroxide. Alternatively ascorbic acid can be added for the same purpose and to the same extent. When catalase is added, just prior to passing the acidified solution 54 into the separator 56, the temperature of the acidified solution 54 should be raised to about 180°F to destroy the enzyme action.

As an additional modification of the basic process, calcium can be added to the protein solids 60 in a very convenient manner by adding calcium carbonate, indicated by the dashed box 66, to the slurry of protein solids as discharged from the centrifugal separator 56. The slurry can be added to a mixer, indicated by the dashed box 68, and the calcium carbonate 66 admixed therewith in sufficient quantity, e.g., 1–2 weight percent, to raise the pH of the mixture to about 6.8. The mixture can then be passed into the dryer 58 and dried to yield protein solid 60 fortified with calcium which can be used for a variety of food purposes, including the synthesis of milk-like products.

The following examples will further illustrate preparation of protein solids in accordance with this invention.

Example 1

Grain residue from a brewing operation in which wort is separated is utilized having about 25 weight percent solids and a pH of about 5.7. One hundred parts of such residue is added to five hundred parts of water and heated so as to increase the temperature at a rate of about 2°F per minute. Heating is effected by direct steam injection. Simultaneously, 0.1 normal sodium hydroxide is continuously added so as to effect a pH of 9.0 at the time that the temperature reaches 195°F, and is continually added thereafter until the solution boils, requiring a total of about ten parts 0.1 normal solution. The resultant alkaline solution is boiled for 5 minutes and then passed to a filter whereupon four hundred parts of alkaline solution are separated from the doubly spent grains. The separated alkaline solution is then heated to 140°F and acidified with 0.1 normal hydrochloric acid until a pH of 6 is achieved whereupon precipitation of solid material takes place. The precipitate is filtered and dried by warm air heating to yield 3.6 parts of protein solids having less than 3 weight percent moisture content. This represents a recovery on the basis of 25 weight percent solids in the original grain slurry of 14.4 weight percent as protein solids. Upon analysis, the protein solids are found to have 8.3 percent total nitrogen and a protein equivalent of 51.8 percent on a moisture-free basis, representing a substantial recovery of protein from the barley malt. Additionally, the doubly spent grains separated from the alkaline solution can be utilized directly as an animal feed.

Example 2

The procedure of Example 1 is repeated except that prior to the heating and addition of alkali to the grain residue, 25 parts of yeast are added thereto which is carried over with the doubly spent grains to yield an enriched animal feed.

Example 3

The procedure of Example 1 is repeated except that 50 parts of yeast are admixed with the doubly spent grain residue, following separation of the alkaline solution, to yield an enriched animal food.

Example 4

The procedure of Example 1 is repeated except that three parts of hydrogen perioxide are added to the acidified solution containing the precipitated protein solids at 140°F and the solution is maintained at that temperature for an additional 10 minutes. Thereafter, two parts of catalse are added to the solution and the temperature raised to 180°F for a period of 10 minutes. The protein solids are separated and dried as in Example 1 to yield bleached protein solids which are white in appearance.

Example 5

The procedure of Example 4 is repeated except that sufficient calcium, carbonate is admixed with separated protein solids, prior to drying, to raise the pH to about 6.8. Thereafter, the precipitate is dried to yield white protein solids enriched in calcium and which may be utilized in synthesizing milk-like products.

I claim:

1. In a process for recovering protein solids from brewer's grains in which said grains are treated with an alkaline solution and in which said alkaline solution is thereafter treated to recover protein solids, the improvement which comprises:
   said treatment with an alkaline solution being carried out in an alkaline solution having a pH of about 9 at a temperature within the range of from 180° to 212°F. so as to place protein material in said brewer's grains in solution in order to produce a mixture of an insoluble residue and a protein solution,
   separating said residue from said solution,
   acidifying said solution to a pH of about 6 so as to precipitate protein solids from said solution, and
   separating said precipitate protein solids from the liquid in said solution.

2. A process as claimed in claim 1 in which:
   said alkaline solution is heated at a rate of at least 1°F. per minute by the infusion of steam into said solution.

* * * * *

UNITED STATES PATENT OFFICE
CERTIFICATE OF CORRECTION

Patent No. 3,846,397     Dated November 5, 1974

Inventor(s) John H. Ernster

It is certified that error appears in the above-identified patent and that said Letters Patent are hereby corrected as shown below:

Column 4, line 41, "available 30-30 percent" should read --available 30-35 percent--.

Column 6, line 10, "catalse" should be spelled --catalase--.

Signed and sealed this 11th day of March 1975.

(SEAL)
Attest:

RUTH C. MASON
Attesting Officer

C. MARSHALL DANN
Commissioner of Patents
and Trademarks